Figure 11:
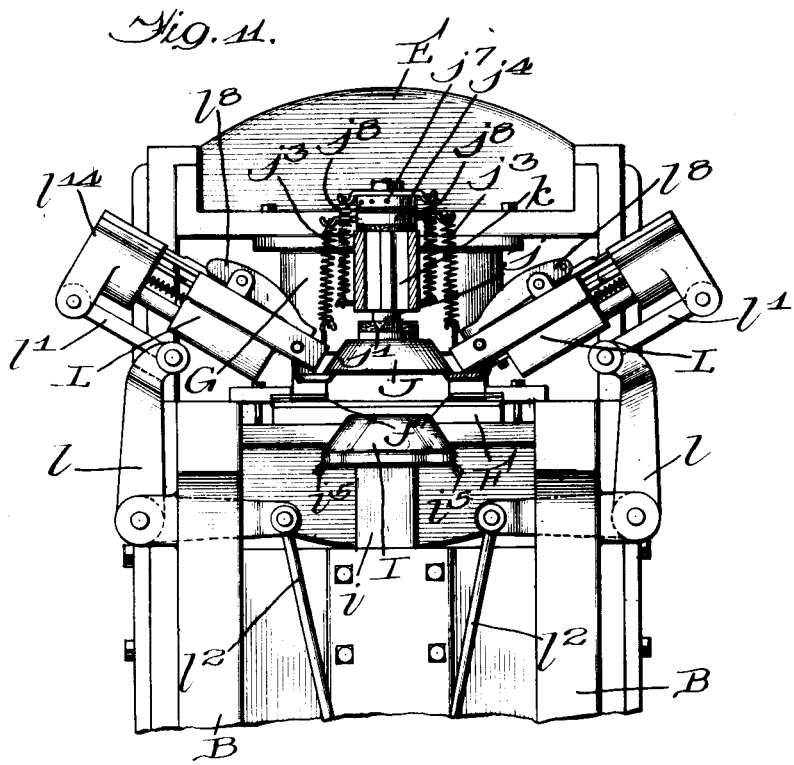

E. CRAIG.
MACHINE FOR MAKING BUTTER DISHES OR OTHER RECEPTACLES.
APPLICATION FILED MAR. 30, 1908.
1,135,666.
Patented Apr. 13, 1915.
9 SHEETS—SHEET 1.
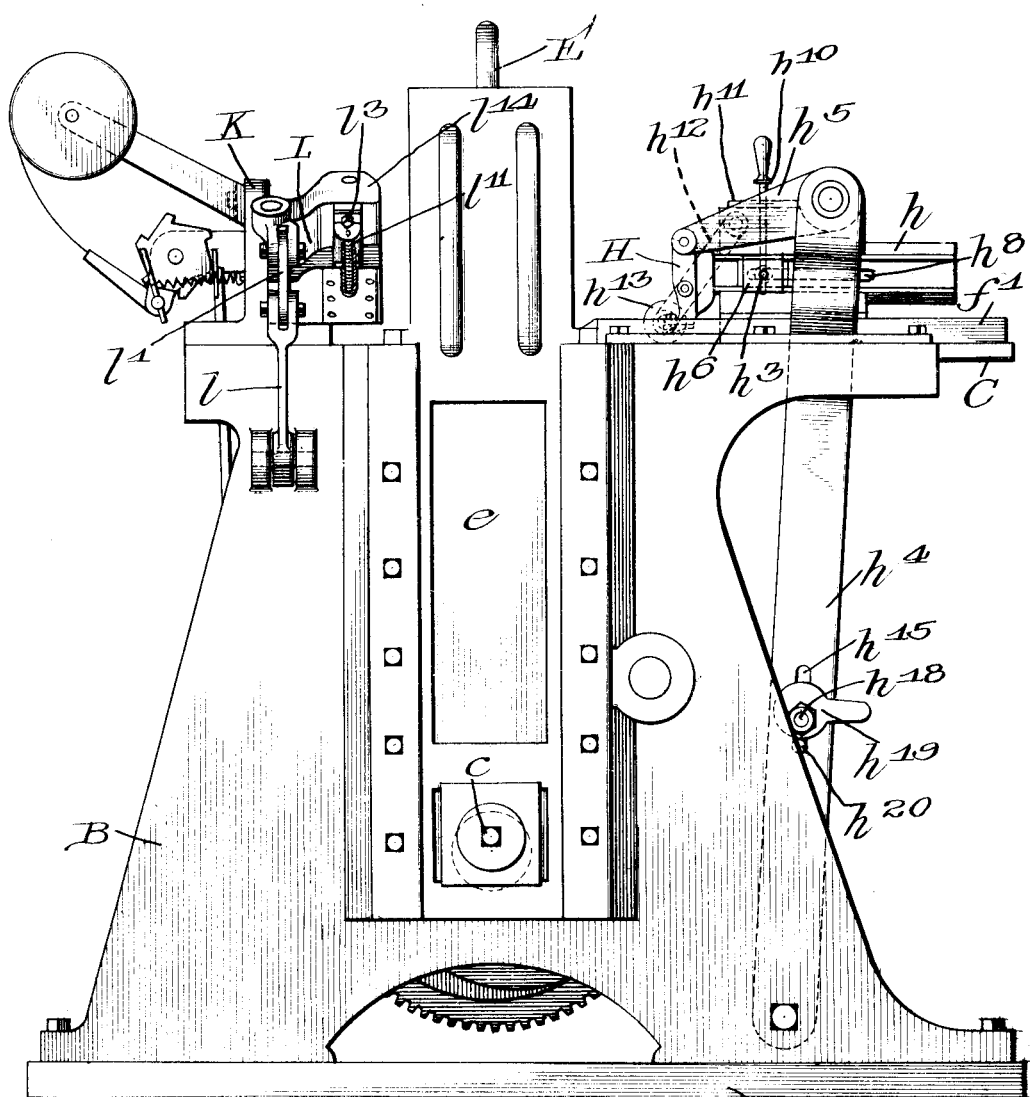

E. CRAIG.
MACHINE FOR MAKING BUTTER DISHES OR OTHER RECEPTACLES.
APPLICATION FILED MAR. 30, 1908.
1,135,666.
Patented Apr. 13, 1915.
9 SHEETS—SHEET 2.
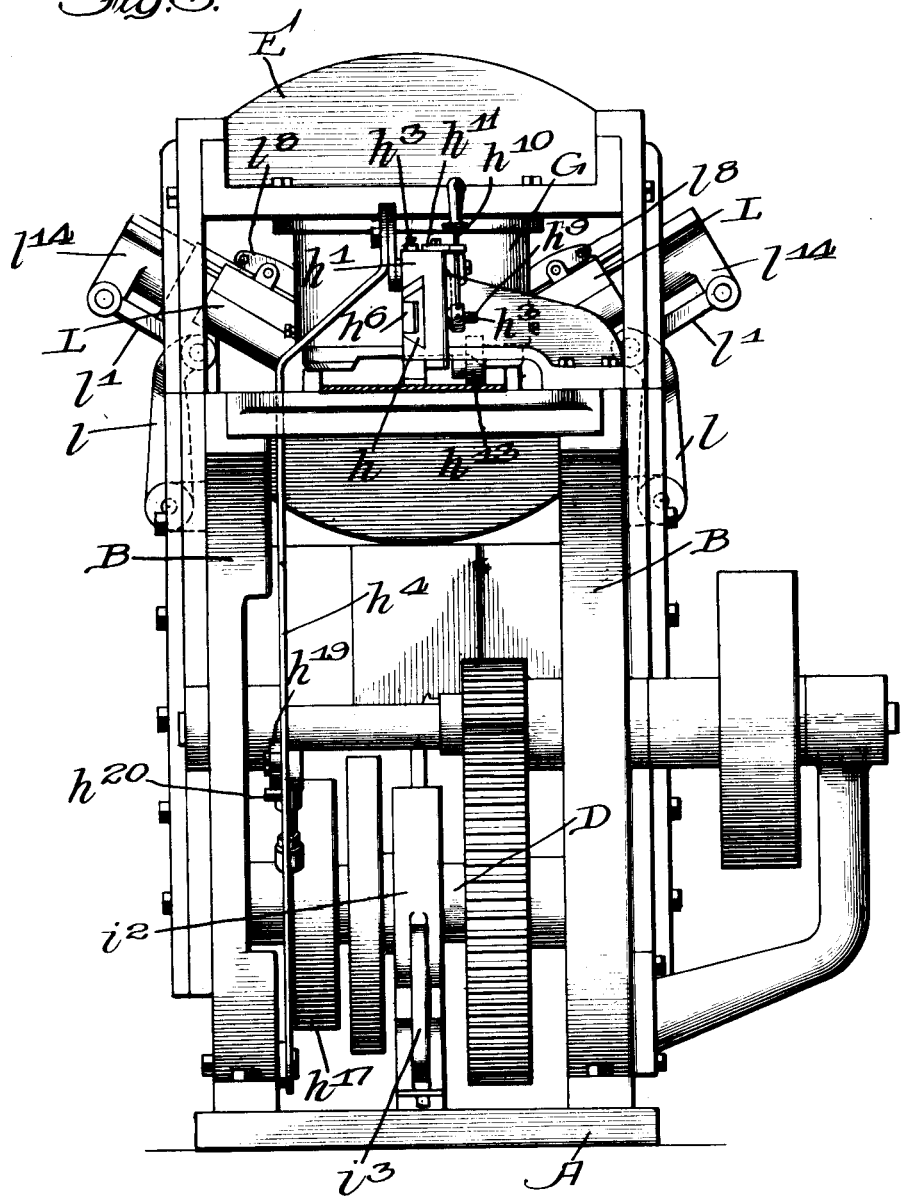

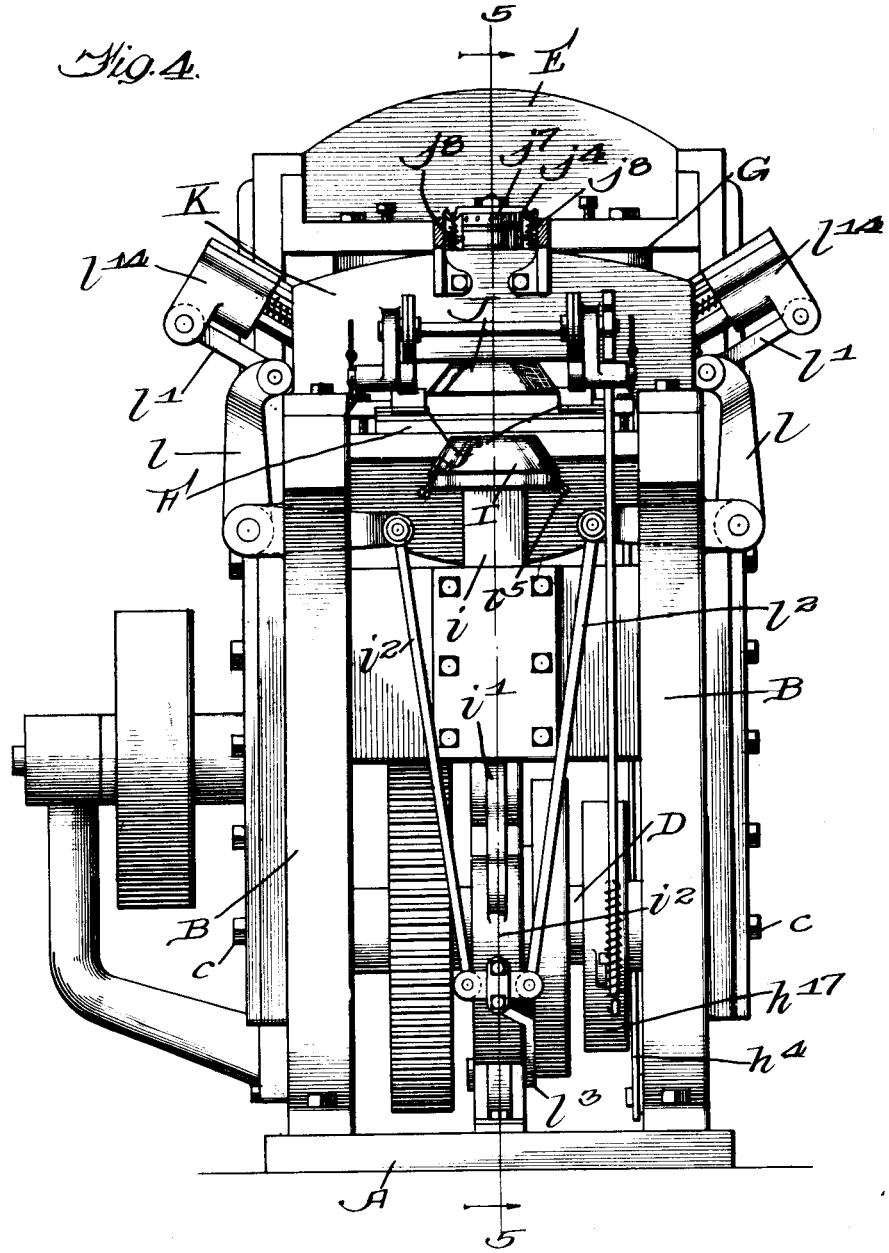

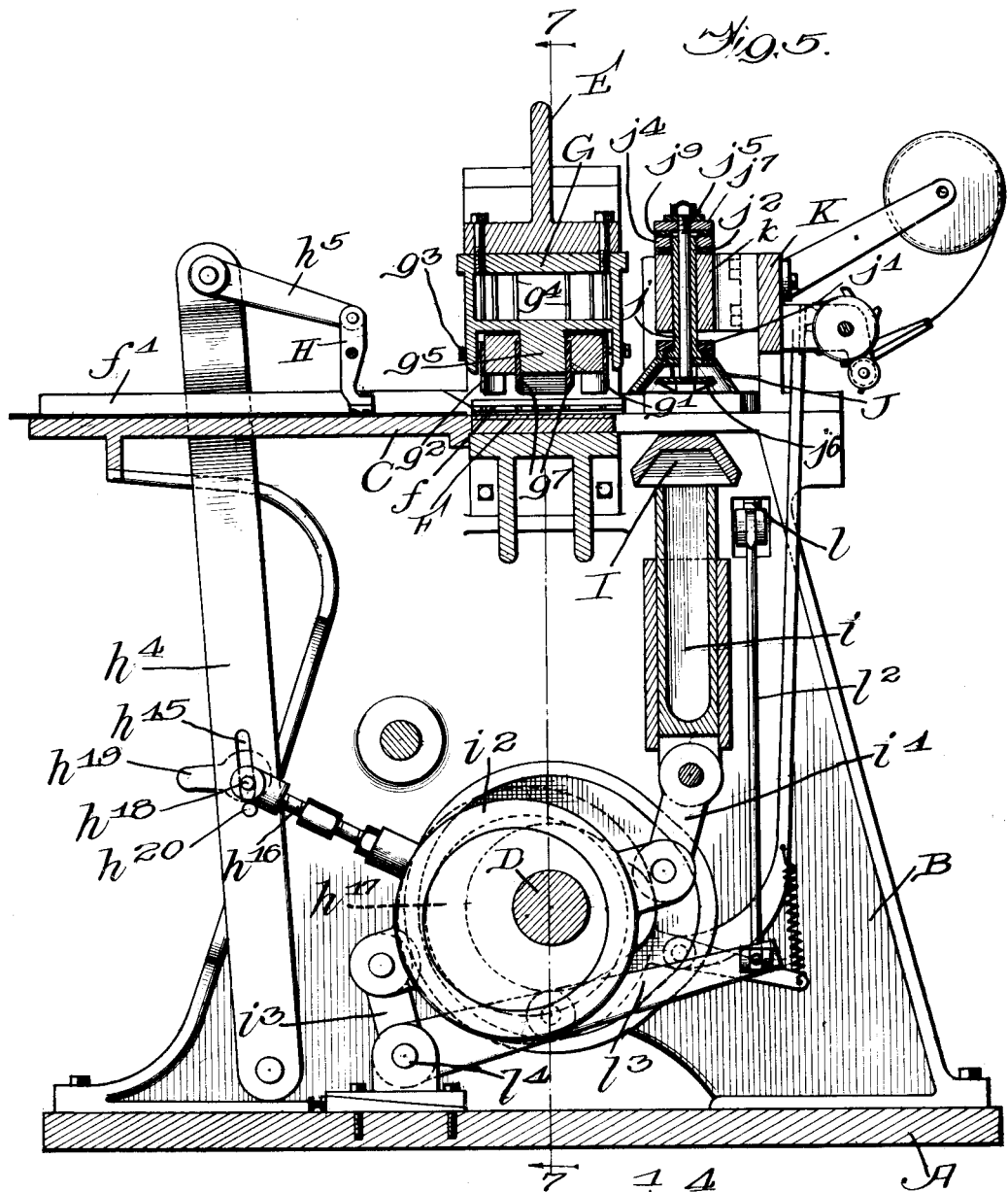

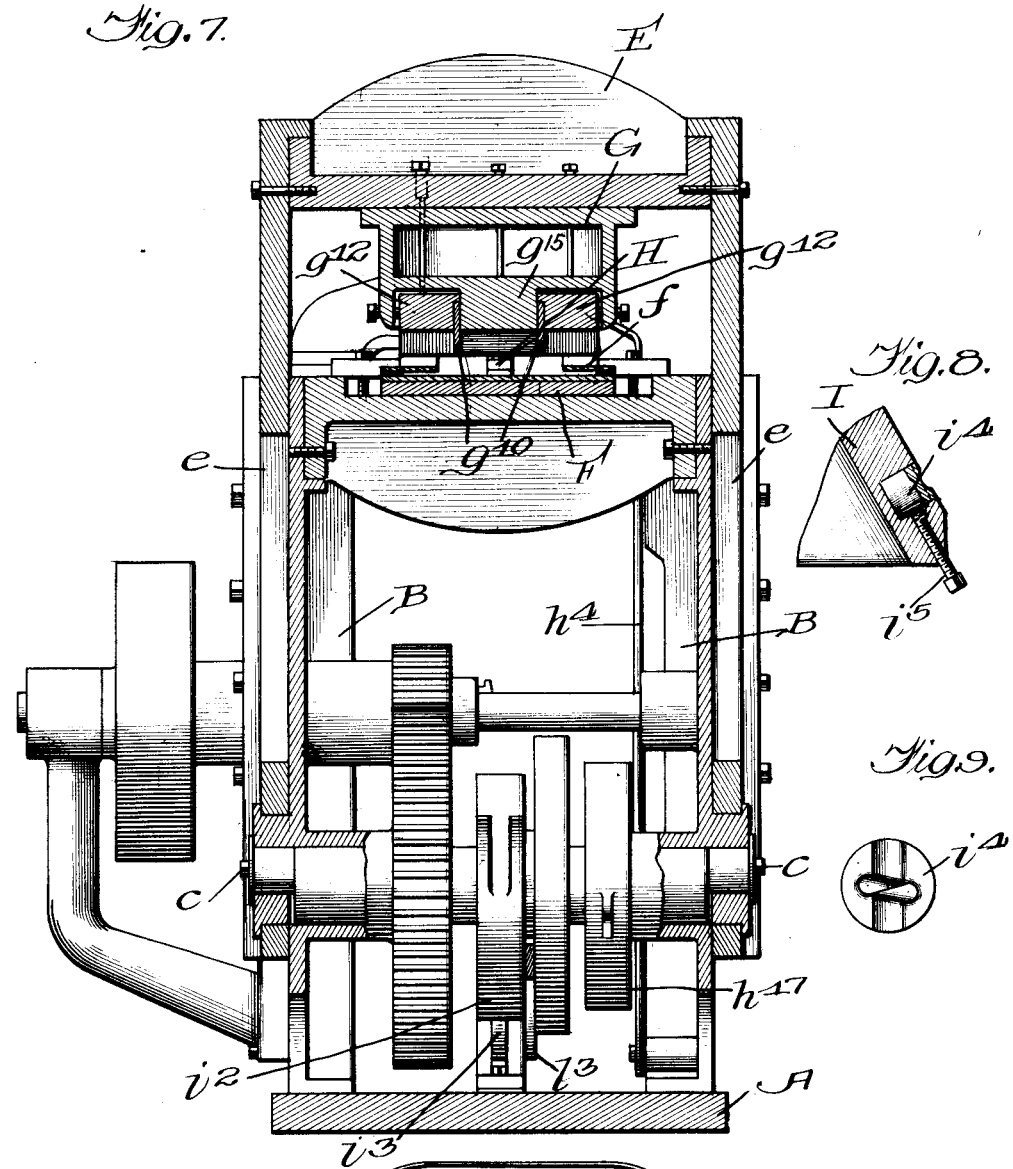

E. CRAIG.
MACHINE FOR MAKING BUTTER DISHES OR OTHER RECEPTACLES.
APPLICATION FILED MAR. 30, 1908.

1,135,666.

Patented Apr. 13, 1915.
9 SHEETS—SHEET 6.

Witnesses:

Inventor:
Edward Craig

E. CRAIG.
MACHINE FOR MAKING BUTTER DISHES OR OTHER RECEPTACLES.
APPLICATION FILED MAR. 30, 1908.
1,135,666.
Patented Apr. 13, 1915.
9 SHEETS—SHEET 7.
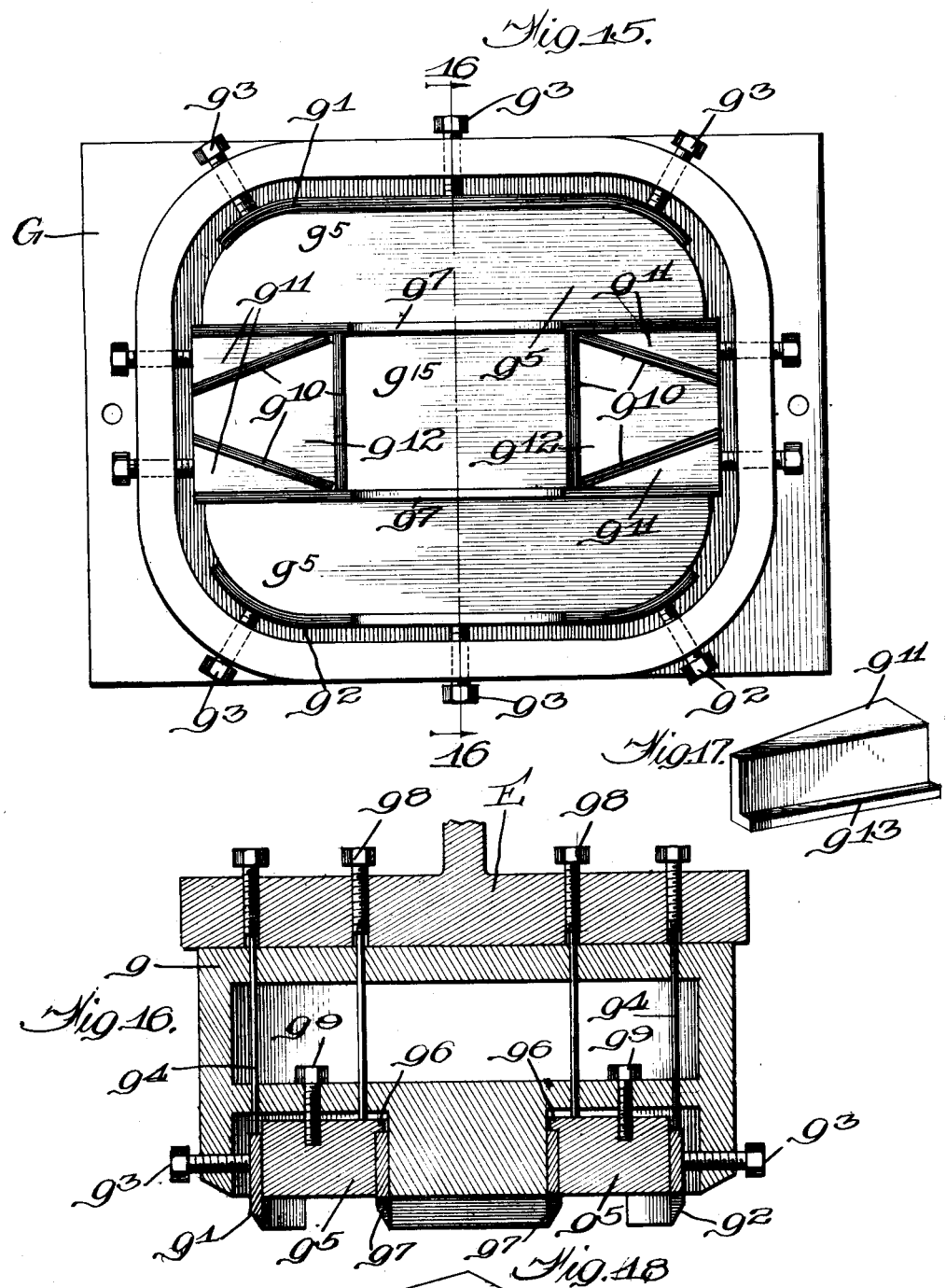

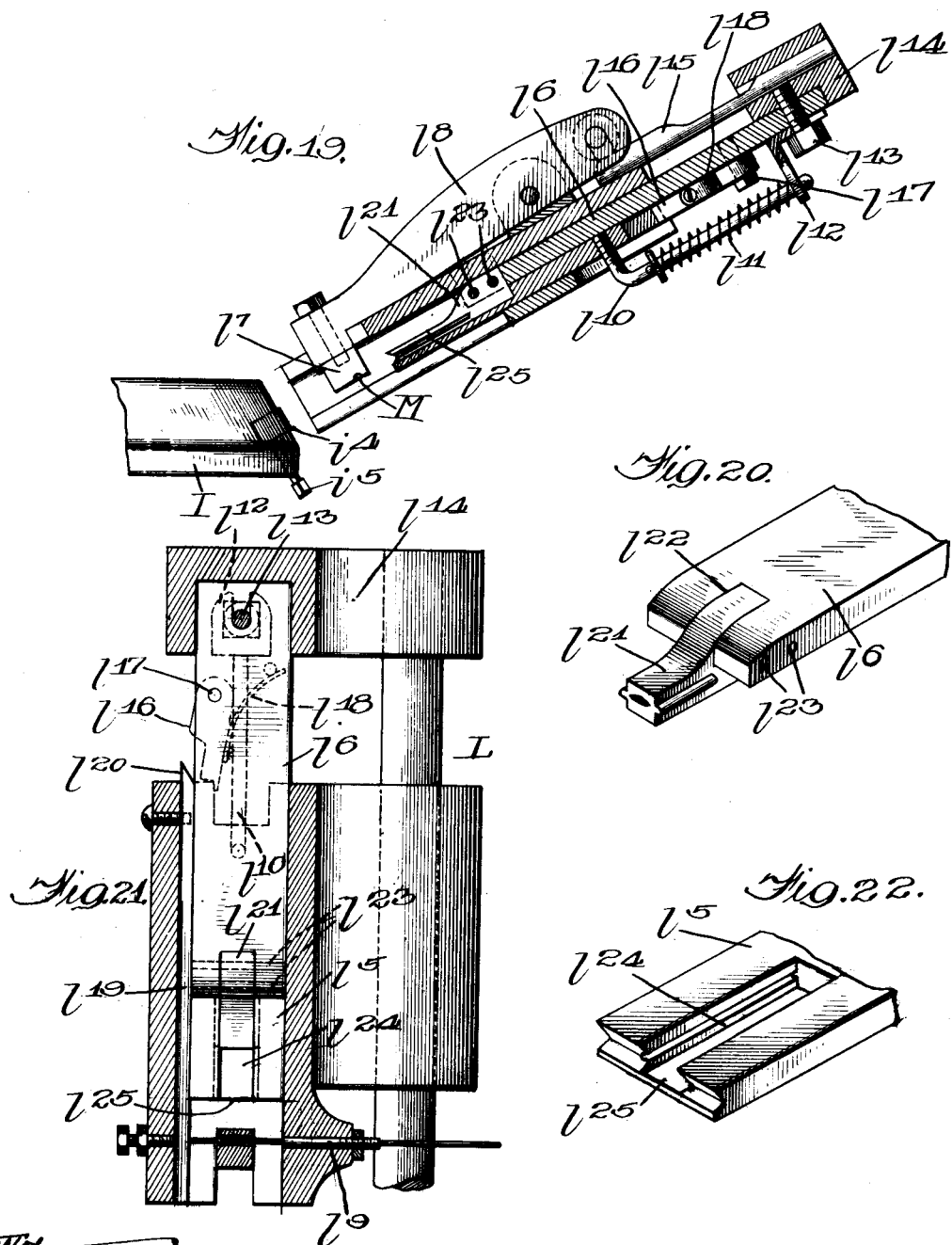

E. CRAIG.
MACHINE FOR MAKING BUTTER DISHES OR OTHER RECEPTACLES.
APPLICATION FILED MAR. 30, 1908.
1,135,666.
Patented Apr. 13, 1915.
9 SHEETS—SHEET 9.
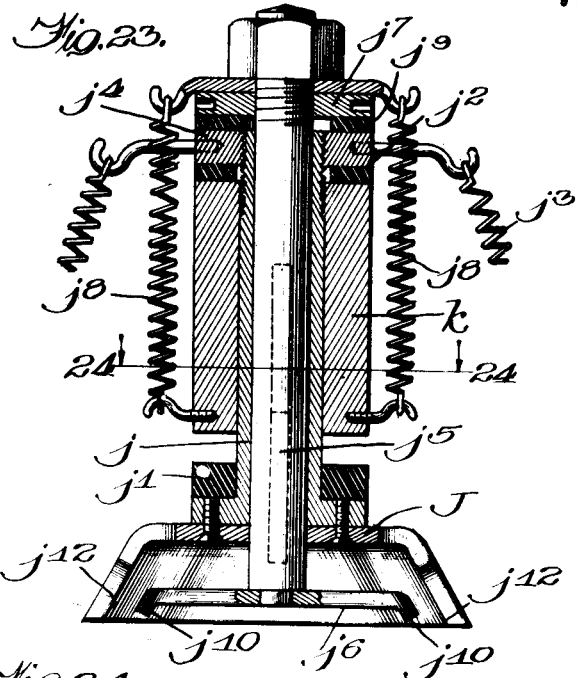
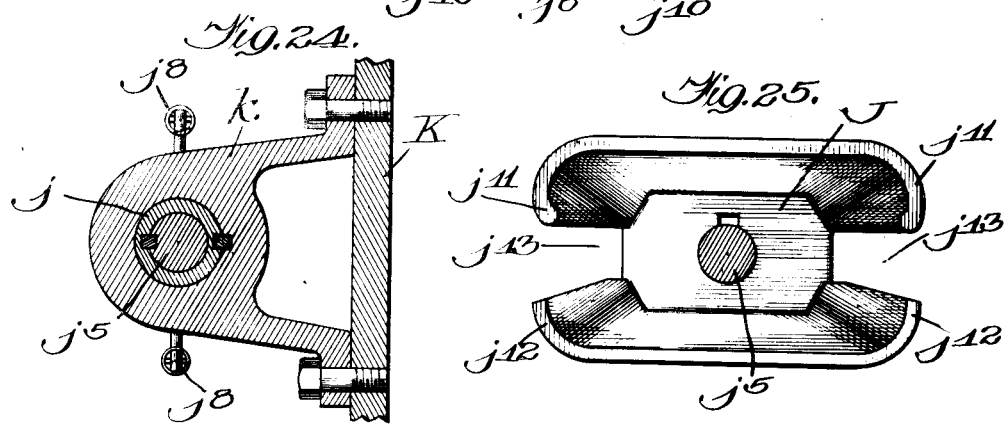
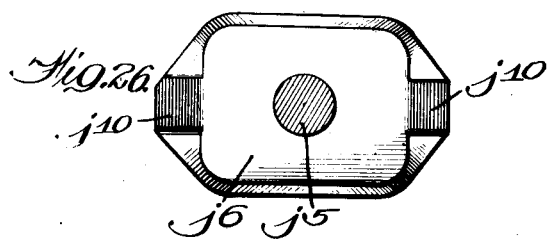
Witnesses:
Inventor:
Edward Craig

UNITED STATES PATENT OFFICE.

EDWARD CRAIG, OF ST. JOSEPH, MICHIGAN, ASSIGNOR, BY MESNE ASSIGNMENTS, TO SARANAC MACHINE CO., OF ST. JOSEPH, MICHIGAN, A CORPORATION OF MICHIGAN.

MACHINE FOR MAKING BUTTER-DISHES OR OTHER RECEPTACLES.

1,135,666.  Specification of Letters Patent.  Patented Apr. 13, 1915.

Application filed March 30, 1908. Serial No. 424,087.

*To all whom it may concern:*

Be it known that I, EDWARD CRAIG, a citizen of the United States of America, and resident of St. Joseph, Berrien county, Michigan, have invented a certain new and useful Improvement in Machines for Making Butter-Dishes or other Receptacles, of which the following is a specification.

My invention relates to machinery for making butter-dishes, or similar receptacles, such as oyster and ice cream pails.

As herein disclosed, my invention is embodied in a machine for making butter-dishes, and is in the nature of an improvement on the machine disclosed in my prior application Serial Number 179,152, although certain features of my invention are, however, of such nature as to be useful in many other kinds of machinery.

My invention relates to the manufacture of that particular kind of butter-dish or other receptacle in which the side walls are folded in a way to make the dish or receptacle perfectly tight and free from cracks or crevices through which a liquid or semi-liquid could leak or escape; and it contemplates broadly a machine which will automatically cut up a sheet of cardboard or other material, fold the blanks into dishes or receptacles of this particular character, and then staple or otherwise secure the folded portions in place. Prior to my invention, these dishes or pails have been made in blank form and then folded by hand. The ordinary form of butter-dish and pail in which the material is cut entirely through, resulting in receptacles having cracks or crevices through which a liquid or semi-liquid can leak or escape, have been made automatically by machinery, as is evidenced by my said prior application.

My present invention is, however, the first instance, so far as I am now aware, of a machine for automatically making the particular kind of dish or receptacle above mentioned, namely the kind in which the sheet material is folded without cutting entirely through the same, thus insuring tight walls all around.

As will hereinafter more fully appear, my invention contemplates, also, a novel and highly efficient stapling mechanism, as well as a novel feed mechanism, adapted for use in different kinds of machinery.

Figure 12:
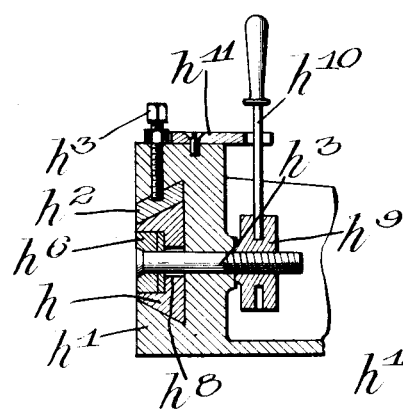
Figure 13:
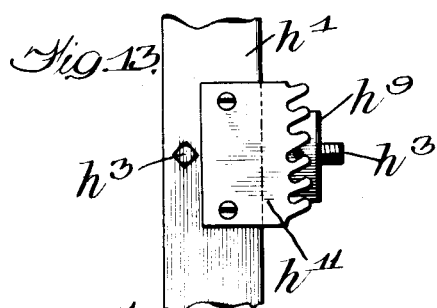
Figure 14:
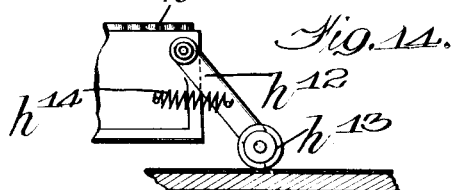

In the accompanying drawings, Figure 1 is a side elevation of a butter-dish machine embodying the principles of my invention. Fig. 2 is a fragmentary perspective of a portion of the support or anvil on which the blanks are cut and scored and creased preparatory to folding and stapling. Fig. 3 is a front elevation of the machine shown in Fig. 1. Fig. 4 is a rear elevation of the same. Fig. 5 is a vertical section on line 5—5 in Fig. 4. Fig. 6 is a perspective of one of the blanks from which the dishes are made. Fig. 7 is a vertical section on line 7—7 in Fig. 5. Fig. 8 is a detail sectional view of one of the clench blocks on the form. Fig. 9 is an enlarged end or face view of said clench block. Fig. 10 is a plan view of a butter-dish with one end folded and stapled, and the other end only partially folded showing how one side is folded under the other, all without cutting entirely through the material at any point within the edges of the blank. Fig. 11 is a rear elevation of the upper portion of the machine. Fig. 12 is a detail sectional view of the tension device for regulating the friction of the feed mechanism. Fig. 13 is a plan of the device shown in Fig. 12, with the handle omitted. Fig. 14 is a detail view of the device associated with the feed mechanism for preventing backward motion of the sheet of cardboard or other material. Fig. 15 is a bottom view of the die or set of knives and creasers for forming the blanks. Fig. 16 is a section on line 16—16 in Fig. 15. Figs. 17 and 18 are perspectives of two of the blocks employed clamping in place the knives and creasers. Fig. 19 is a detail sectional view of one of the staplers. Fig. 20 is a perspective of the end of the staple driver. Fig. 21 is another sectional view of the stapler. Fig. 22 is a perspective of the end of the staple former. Fig. 23 is an enlarged section of the dish-forming head or concave form. Fig. 24 is a section on line 24—24 in Fig. 23. Fig. 25 is a bottom view of the concave dish form. Fig. 26 is a bottom view of the folder and knock-out disposed within the said form.

As thus illustrated, my invention comprises a base A, upon which are supported the two side portions B of the body frame, the latter being connected at their upper ends by a horizontal table C. The drive shaft D is mounted in suitable bearings and provided at its ends with reciprocating or sliding eccentric connections $c$ for operating the cross head E, which latter is connected with the said eccentric devices by vertically reciprocating members $e$. The said table supports and anvil or stationary die F are provided with notched guards $f$, which latter overlap the blank to prevent the same from rising. The guides $f'$ serve to properly direct the said blank to the said die or anvil. The cross head E is provided with a vertically reciprocating die or set of cutting and creasing knives G, the same comprising a frame $g$ suitably secured to the said cross head. Within the said frame are arranged the knives $g'$, $g^2$. These knives are held in place by clamping screws $g^3$. The backs or upper edges of said knives are engaged by the adjustable screws $g^4$, whereby the said knives can be properly adjusted to sever or cut off the material. These knives are clamped against the spacing blocks $g^5$, which latter have flanges $g^6$, upon which are seated the backs or upper edges of the scoring knives $g^7$. These scoring knives make the score lines $l$ in the blank, shown in Fig. 6, and only pass partially through the material. The screws $g^8$ bear upon the tops of the blocks $g^5$ to suitably adjust the same, said blocks being supported by screws $g^9$. The creasers $g^{10}$ are arranged in the manner shown in Fig. 15, being disposed between the scoring knives $g^7$, and are spaced apart by the blocks $g^{11}$ and $g^{12}$, the same having flanges $g^{13}$ and $g^{14}$ forming seats for the backs or upper edges of said creasers. It will be seen that the said knives and creasers are all clustered about and clamped upon the central portion $g^{15}$ of the frame $g$. The said creasers provide the crease lines 2 shown in Fig. 6. Thus it will be seen that a rectangular blank is provided, having the corners thereof rounded, and having score and crease lines at the ends thereof. Nowhere within the margin or edges of said blank is the material entirely cut through or severed.

The feed pawl or clamping foot H works back and forth over the front portion of the table, and is mounted upon the end of the horizontally reciprocating bar $h$, which latter is mounted to slide in a bearing $h'$, there being a gib $h^2$ applied to the top of said bar, whereby the friction or tension can be regulated by a screw $h^3$ bearing upon the top of said gib. The upper end of said feed pawl or clamping foot is connected with the upper end of an arm or lever $h^4$, by means of a link or arm $h^5$ pivoted upon the upper end thereof. Thus power is applied directly to the said feed pawl or clamping foot, and the movement of the lever $h^4$ toward the cross head causes the said feed pawl or clamping foot to bear down upon the sheet of material upon the table as well as to move forward. When the lever $h^4$ moves in the other direction, then the said feed pawl or foot H is released from the sheet of material and moves back with the bar $h$. The proper degree of friction can be established for the bar $h$ and the same held firmly in its bearings by a clamping device $h^6$ carried on the head of a screw $h^7$, which latter extends through a slot $h^8$ in the bar $h$. The nut $h^9$ on the said screw is provided with a spring handle $h^{10}$, which latter is adapted to be held in different positions by a rack $h^{11}$.

It will be seen that the feed pawl or foot H must go down and grip the material before it starts to move forward, and must release the said material before it starts to move back to its original position, in order to insure the proper feeding of the material. This is accomplished by regulating the friction device on the support for the said pawl or foot, through the medium of the handle $h^{10}$, which latter can be shifted and locked in various positions to vary the said friction. For different speeds—that is to say, when the machine is run at different speeds—the said friction must be varied, and this is done, as stated, by moving the said handle along the rack $h^{11}$ until an amount of friction suitable for the speed at which the machine is operating has been attained, thus insuring the requisite feeding action of the foot or pawl H. In other words, the friction or drag on the support upon which the pawl is mounted must always be such that the said pawl H firmly grips the sheet of material before moving forward, and always releases the said material before moving backward.

The bearing $h'$ carries a pivoted arm $h^{12}$ having its free end provided with a roller $h^{13}$ adapted to bear upon the paper or sheet of material to prevent the same from moving backward. When the motion of the feed mechanism is reversed, the said roller is caused to bear with sufficient pressure upon the paper or sheet of material by a spring $h^{14}$, which connects the arm $h^{12}$ with the frame of the machine—that is to say, with the bearing $h'$ mounted upon the table. The arm or lever $h^4$ is provided with a slot $h^{15}$, in which is mounted the end of the connection $h^{16}$ extending from the eccentric device $h^{17}$ on the drive shaft. The pin $h^{18}$ of said connection is adapted to slide up and down in the said slot, and is provided at one end with a cam $h^{19}$ adapted to rest upon the pin $h^{20}$. It will be seen that the rotation or adjustment of this cam to different positions will cause a vertical adjustment of the connection in the slot $h^{15}$ and hold the same in such adjusted position so as to determine with exactness the character of stroke desired for the feed.

The vertically reciprocating convex form I is arranged below the level of the table, and in rear of the cutting mechanism for forming the blanks. The said form or convex die for forming the dishes or other receptacles is mounted upon the upper end of a vertically reciprocating member $i$, which latter is actuated by a link $i'$ suitably connected with an eccentric lever $i^2$ operated by the drive shaft and fulcrumed upon the upper end of a link $i^3$, which latter is pivoted to the base of the machine. The said form or convex die I has the shape desired for the interior of the dish or receptacle, and is preferably provided with clench blocks $i^4$, held in place by screws $i^5$. Coöperating with the said form or convex die is a concave die or form J, which latter is secured to the lower end of a hollow stem $j$, having a bumper $j'$ encircling the base or lower portion thereof. The frame of the machine— that is to say, the table thereof—carries a cross bar or web K, having a bearing $k$ in which the said hollow stem $j$ is mounted to slide up and down. The said stem is held normally upon a rubber bumper $j^2$ by springs $j^3$, which latter connect the nut $j^4$, on the upper end of said stem, with the frame of the machine. A solid stem $j^5$ is keyed within the said hollow stem, and adapted to slide up and down therein, being provided at its lower end with a combined folding device and knock-out $j^6$. The upper end of said solid stem is equipped with an adjusting nut or ring $j^7$, and is connected with the bearing $k$ by means of springs $j^8$. In this way, both stems are held normally depressed, the nut $j^7$ normally resting on the rubber bumper $j^9$ seated on top of the nut $j^4$. Normally, the plunger or lower folding device and knock-out $j^6$ is slightly below the concave form J, as shown in Fig. 23. When a completed blank is fed to a position above the form I, and then cut off by the downward stroke of the cross head, the portions $j^{10}$ first engage the end portions 3 of the blank, causing the same to be depressed, said end portions 3 forming inner walls that taper toward the outer edge of the dish. The continued upward movement of the said form finally brings the blank into full engagement with the upper form J, which latter is adapted to serve as a receiving former and is provided with folding portions $j^{11}$ and $j^{12}$ disposed at opposite sides of the recesses $j^{13}$ at the ends of the form. The portions $j^{11}$ are thus brought into engagement with the portions 4 of the blank, causing the same to be doubled along the lines 1 and 2, as shown more clearly in Fig. 10. Immediately after, the portions $j^{12}$ engage the portions 5 of the blank, causing the same to be doubled and folded over upon the doubled-up portions 4, as shown in Fig. 10. It will be seen, therefore, that the portions $j^{10}$ operate in advance of the full insertions of the plunger I in the form J, and constitute folding means disposed between said plunger and form. It will be understood, of course, that this doubling and overlapping of the creased and scored material at the ends of the blank is due also to the concave shape of the form J, the blank when pressed in the form of a dish having the material at its ends crowded inwardly. In this way, the end portions 3 of the dish or receptacle are each provided with two outer double thicknesses overlapping each other, upon the outside thereof, the outside edges of the overlapping double thicknesses or doubled-up portions being coincident with or defined by the score lines 1 of the blank. The inner edges of the doubled portions are defined by the crease lines 2, as shown in Fig. 10. It will be understood that the score lines are made by knives, whereas the crease lines are made by blunt edges which merely jam or press the material of the blank, so that it will bend readily along such lines. Thus the material is automatically cut and folded into shape to provide a dish or receptacle, of any suitable character, without leaving any cracks or crevices at the sides thereof, which is of great advantage for certain purposes. In this way the dish or receptacle is adapted to hold liquid ingredients without any leakage.

When the blank has been properly folded by the action of the coöperating dies or forms, the outside doubled portions are stapled one upon the other by staples 6 inserted through the folded or doubled ends of the blank, as shown in Fig. 10. For this purpose, the machine is provided with staplers L disposed obliquely at opposite sides of the machine, and in position to insert the said staples in a direction practically at right angles to the beveled ends of the form I. The said staplers are operated by bell cranks $l$ disposed at opposite sides of the machine and connected with the upper ends of the stapling heads by means of links or short rods $l'$, in the manner shown. The lower and inner ends of said bell cranks are connected by rods $l^2$ with the distal end of a lever $l^3$, which latter is actuated by the eccentric device $i^2$, its other end being pivoted to the base of the machine at $l^4$. Thus the rotation of the drive shaft not only operates the feed mechanism and the cutting mechanism and the forming mechanism, but also the staplers. For the broader purposes of my invention the said staplers may be of any suitably known or approved character, but as herein shown are each provided with a staple former $l^5$ and a staple driver $l^6$, together with an anvil or loop bar $l^7$ carried on the end of a lever or pivoted arm $l^8$. The wire for the staples is fed through a tube $l^9$, directly into the path of the staple former, as shown in Fig. 21. The said staple former is provided with a bent rod $l^{10}$ upon which is mounted a compression spring $l^{11}$, said spring being compressed between a shoulder on the said rod and a shoulder $l^{12}$ carried by the bolt or screw $l^{13}$ by which the staple driver is secured to the reciprocating head or support $l^{14}$. Thus the staple driver and former have a yielding connection, the staple former being the first to engage the wire and cut off and bend the same over the loop bar, so as to form the staple. As soon as this is done, the cam $l^{15}$ disengages the upper end of the arm or lever $l^8$, permitting the said loop bar to swing out of the path of the staple former and driver. For the initial portion of their stroke, the former and driver are locked together by a pivoted latch $l^{16}$, which latter is pivoted on the driver at $l^{17}$ and adapted to engage the upper end of the former with its lower or free end, the said latch being actuated by a spring $l^{18}$ to keep it in latched position. The gib $l^{19}$, by which the former and driver are held tightly in their bearings, is provided at its upper end with a cam $l^{20}$ adapted to engage the said latch to disconnect the former from the driver, and permit the driver to descend without further movement on the part of the former. The said driver has a separately formed engaging or driving portion $l^{21}$, removably held in a notch $l^{22}$ by pins $l^{23}$, the driver in this way having a shoulder on which the upper end of the portion $l^{21}$ engages or abuts to receive the thrust or driving pressure. The said portion $l^{21}$ slides in the slot $l^{24}$ of the staple former, which latter is adapted to straddle the anvil or loop bar $l^7$ while the staple is being formed. As soon as the staple former engages the butter dish, then the latch $l^{16}$ disconnects the former from the driver, permitting the latter to then descend alone, for the purpose of inserting the staple. The former has the slot thereof closed at its lower or outer side by the thin wall $l^{25}$. This wall, it will be seen, prevents the head of the staple from slipping out of the notch M in the loop bar, and the edge of this wall bears against the folded portion of the butter dish to hold the same in place while the staple is being driven. Also, it will be seen that the lower bent portion of the rod $l^{10}$ travels in an outer slot in the stationary casing or head of the stapler. When the said rod engages the bottom or lower end of said slot, then the former stops moving. In this way the said rod serves also as a stop for limiting the movement of the staple former, permitting the latter to have movement a little in excess of that which is necessary to bring it into engagement with the stock or material of the butter dish. The relative movements are such that the staple driver will carry the staple out of the end of the staple former, if a staple happens to be driven when no stock or material is in position to receive the staple. In this way a staple cannot remain in the staple former.

It will be seen that the plunger I and the folding devices above the same, including the flap engaging portions $j^{11}$ and $j^{12}$, as well as the end wall engaging portions $j^{10}$, are of such character that the entire folding operation, including the production of the flaps of double thickness, is accomplished simply and merely by the upward thrust of said plunger. In other words, the said plunger is moved upward, and the devices coöperating therewith are of such character that the entire folding and doubling of the sheet material is accomplished by this movement of the plunger, no other folding operations being necessary thereafter. The said flaps, it will be seen, are composed of the triangular portions 4 and the adjacent portions of the material immediately at the other side of the score lines 1 of the blank, these flaps of double thickness being folded at their upper ends for the full width thereof, and this overlapping being substantially equal to the width of the upper ends of the end walls 3, as illustrated in Fig. 10 of the drawings. The staples 6 each extend across the outer surface of the dish or receptacle, from one flap to the other, and in this way each staple connects the two flaps together and serves to hold five thicknesses of the sheet material in super-imposed condition at each end of the dish or receptacle. The hollow form J receives the bottom of the receptacle, the latter being thrust into said form by the upward movement of the plunger, and after this no further pressing or manipulation of the sheet material is necessary. Of course, when the staples are driven, the staple formers are operated in such a manner that their portions $l^{25}$ engage the folded flaps of the dish and compress them flatwise together, while the drivers are inserting the staples. The doubling and folding, however, along the predetermined fold lines is accomplished, as stated, by the upward thrust of the plunger I, and the flap engaging portions of the hollow form J are of such character that, although disposed in fixed relation to each other, they cause the flaps of double thickness to assume their desired relative positions one outside of the other at each end of the receptacle.

With further respect to the formation of the butter dish tray or receptacle shown in Fig. 10, from the blank shown in Fig. 6, it will be seen that this is accomplished without previous folding of the said blank. In other words, the plunger I is caused to move upwardly against a perfectly flat and open blank, and the continuing thrust of the plunger serves to accomplish all necessary folding of the blank. The receiving former J is, it will be seen, movable a distance with the said plunger, and is adapted to discharge the completed receptacle downward, whereby gravity is advantageously involved in the delivery or discharge of the receptacle from the folding and forming devices. The folders $j^{10}$ operate in advance of the portions $j^{11}$ and $j^{12}$, to the extent necessary to bring the tapered end walls 3 into position ahead of the flaps, which latter, it will be seen, are two-ply in character and formed with folded or creased edges 1 which render the receptacle practically water tight, the creased edges 2 serving this same purpose. The folders $j^{10}$ are, therefore, disposed in position between the plunger I and the receiving former J, whereby the blank is subjected to a folding operation before it is crowded and forced tightly into the said receiving former by the thrust of the plunger. After this preliminary folding operation, the said plunger and receiving former coöperate to compress the dish or receptacle throughout the area thereof, causing the receptacle to assume the desired shape for the dish. The staplers, as previously described, operate against the folded or creased edges of the two-ply flaps, causing these flaps to be compressed tightly against the tapered end walls 3, and the staples which are driven reach across the outer surface of the dish from one flap to the other, thereby forming an externally connected link or pin between the two adjacent flaps, it being understood that each staple when thus inserted and clenched in place becomes stationary and fixed in character, whereby the ends of the dish are permanently and tightly and solidly fastened by separate but simultaneously driven staples. The banking press comprises a reciprocating head G which coöperates with the folding devices to produce the two-ply flaps and tapered end walls 3, it being observed that both the said press and the said folding devices are constructed with special reference to the formation of these flaps and walls. Thus no previous folding of the blank is necessary, notwithstanding the peculiar character of the dish or receptacle, for the entire folding operation is accomplished by the thrust of a single plunger against the surface of a perfectly flat and unfolded blank.

With the construction shown and described, it will be seen that the sheet material is subjected to two operations. The first operation is a preliminary creasing and scoring operation, and the second one is a folding and shaping operation which also involves a creasing of the paper or other sheet material. In other words, and just as a sheet of paper may be folded and then creased between the thumb and finger, the devices above the plunger serve like thumbs and fingers for doubling and thereby creasing the sheet material to form the two-ply flaps. But this final folding and shaping and creasing operation is facilitated, of course, by the operation of the blanking press which forms creases or grooves and scores lines on the upper surface of the sheet material, thereby determining the lines along which the plunger and the mold or form above it, as well as the intermediate folding fingers or devices, are to subsequently fold and tightly crease the two-ply flaps smoothly and flatly against the outer surfaces of the walls of the dish or receptacle.

What I claim as my invention is:

1. In a butter dish machine, suitable forming and stapling mechanism for operating on sheet material, means for engaging the sheet of material to feed the same to said mechanism, an arm for actuating said means, having a slot therein, a pin at the lower end of the slot, a connection for operating said arm, and a cam engaging said pin to raise and lower the connection in said slot, for the purpose set forth.

2. In a butter dish machine, suitable forming and stapling mechanism for operating on sheet material, means for feeding the sheet of material to said mechanism, comprising a sliding bar, a friction device engaging said bar, a threaded stem and a nut thereon for adjusting said device to vary the friction, a spring handle for said nut, and a rack for releasably holding said spring handle in different positions, for the purpose set forth.

3. In a butter dish machine, mechanism for forming the dish, an automatic device for feeding the sheet of material to said mechanism, a swinging spring pressed arm, and a roller carried by the arm and bearing on the sheet of material, said device including a feed finger having a plurality of axes of movement which are parallel with the axes of the said arm and roller, for the purpose set forth.

4. In a butter dish machine, a form, an obliquely arranged stapler, a bell crank associated with said stapler to operate the same, a pull rod for actuating said bell crank, by a downward pull on the latter, to drive a staple, cam mechanism for operating said rod, and another rod connecting the bell crank with the stapler, said rods disposed at an angle to each other, said mechanism including a pivoted lever having a distal end to which said first mentioned rod is secured.

5. In a butter dish machine, a die for making the blank, comprising a set of creasers, a set of scoring knives, a set of cutting knives, clamping blocks having flanges for engaging the backs of said scoring knives and creasers, means for engaging the backs of said cutting knives to accurately adjust the same, and means engaging said blocks to accurately adjust the scoring knives and creasers.

6. In a butter dish machine, mechanism for forming the dish with folded and doubled end portions, a stapler comprising a former and driver, a pivoted spring-pressed latch on the driver engaging the former, a cam adapted to engage said latch to disconnect the former from the driver, and means including a compression spring on a rod for yieldingly connecting the former with the driver, and for forcing said former against the folded and doubled end portion of the dish, said stapler disposed in position to operate upon the dishes formed by said mechanism.

7. In a butter dish machine, mechanism for forming the dish with folded and doubled end portions, a stapler having a former and driver, the former having a slot closed at one side by a thin wall, within which slot the driver slides, the edge of said wall bearing against the folded and doubled end portion of the dish, as set forth, said stapler disposed in position to operate upon the dishes formed by said mechanism.

8. In a butter dish machine, mechanism for forming the dish with folded and doubled end portions, a stapler having a former and driver, the same being yieldingly connected by means including a spring extending directly between the upper ends thereof, for forcing the said former against the folded and doubled end portion of the dish, as set forth, said stapler disposed in position to operate upon the dishes formed by said mechanism.

9. In a butter dish machine, means for forming a dish with folded and doubled end walls, a stapler having a driver, a former, a loop bar, a rod on the upper end of the former, rigid therewith, a driving arm, and a spring connecting said rod with said driving arm, operating to force the said former against the folded and doubled portion of the dish.

10. A machine for making dishes, comprising mechanism for folding and doubling the sheet material to produce upwardly tapering inner end portions, and means for securing the said portions in place, said mechanism including a hollow forming member having openings at each end, the edges of said openings being turned in at one side thereof, and folding fingers coöperating with said openings to form the end walls of the dish.

11. A machine for folding and fastening sheet material to form receptacles, comprising a reciprocating plunger for shaping the receptacle, devices coöperating therewith to accomplish the entire folding and forming operation by the thrust of said plunger, serving to double the sheet material upon itself to form flaps of double thickness, and mechanism for applying fasteners to secure said flaps in position externally of said receptacle, said devices including means to discharge the completed receptacle downward.

12. A machine for folding and fastening sheet material to form receptacles, comprising a reciprocating plunger for shaping the receptacle, devices coöperating therewith to accomplish the entire folding and forming operation by the thrust of said plunger, serving to double the sheet material upon itself to form flaps of double thickness, and mechanism for applying separate fasteners to secure said flaps in position externally of said receptacle, constructed and arranged to cause each fastener to extend across the outer surface of the receptacle from one flap to the other, and said devices being arranged with spaces through which said mechanism operates to apply said fasteners.

13. A machine for folding and fastening sheet material to form receptacles, comprising a reciprocating plunger for shaping the receptacle, devices coöperating therewith to accomplish the entire folding and forming operation by the thrust of said plunger, serving to double the sheet material upon itself to form flaps of double thickness, and mechanism for applying fasteners to secure said flaps in position externally of said receptacle, said devices including flap engaging portions disposed in fixed relation to each other, and said devices being arranged to discharge the completed receptacle downward.

14. A machine for folding and fastening sheet material to form receptacles, comprising a reciprocating plunger for shaping the receptacle, devices coöperating therewith to accomplish the entire folding and forming operation by the thrust of said plunger, serving to double the sheet material upon itself to form flaps of double thickness, and mechanism for applying fasteners to secure said flaps in position externally of said receptacle, said devices including movable elements for engaging the bottom and certain walls of the receptacle, and having four relatively fixed flap engaging portions disposed in position to effect the folding of the flaps of double thickness upon two of said walls.

15. A machine for folding and fastening sheet material to form receptacles, comprising a reciprocating plunger for shaping the receptacle, devices coöperating therewith to accomplish the entire folding and forming operation by the thrust of said plunger, serving to double the sheet material upon itself to form flaps of double thickness, and mechanism for applying fasteners to secure said flaps in position externally of said receptacle, said devices including a pair of relatively fixed elements for engaging certain walls of the receptacle, and a member shaped to receive said plunger and having four relatively fixed flap engaging portions, each of said portions being curved to properly double and fold the flaps into place as the result of the operation of said plunger, and said devices having means for engaging the bottom wall of the receptacle and being arranged to discharge the latter downward when completed.

16. A machine for folding and fastening sheet material to form receptacles, comprising a reciprocating plunger for shaping the receptacle, devices coöperating therewith to accomplish the entire folding and forming operation by the thrust of said plunger, serving to double the sheet material upon itself to form flaps of double thickness, and mechanism for applying fasteners to secure said flaps in position externally of said receptacle, said devices including a pair of relatively fixed elements for engaging certain walls of the receptacle, and a member shaped to receive said plunger and having four relatively fixed flap engaging portions, each of said portions being curved to properly double and fold the flaps into place as the result of the operation of said plunger, and said portions being formed to cause two of said flaps to overlap and fold upon the other flaps, said devices also having spring operated means for discharging the completed receptacle downward.

17. A machine for folding and fastening sheet material to form receptacles, comprising a reciprocating plunger for shaping the receptacle, devices coöperating therewith to accomplish the entire folding and forming operation by the thrust of said plunger, serving to double the sheet material upon itself to form flaps of double thickness, and mechanism for applying fasteners to secure said flaps in position externally of said receptacle, said devices being constructed and arranged to fold one flap upon the other at opposite ends of the receptacle, and said devices including means coöperating with said plunger to overlap the flaps one upon the other a distance substantially equal to the length of the upper edges thereof.

18. A device for folding and fastening sheet material to form receptacles, comprising a reciprocating plunger for shaping the receptacle, devices coöperating therewith to accomplish the entire folding and forming operation by the thrust of said plunger, serving to double the sheet material upon itself to form flaps of double thickness, and mechanism for applying fasteners to secure said flaps in position externally of said receptacle, said devices being constructed and arranged to fold the sheet material along lines which in effect provide the receptacle with upwardly tapered end walls, and said devices including means coöperating with said plunger to cause the upper end portions of said flaps to overlap each other a distance substantially equal to the width of the upper ends of said walls.

19. A machine for folding and fastening sheet material to form receptacles, comprising a reciprocating plunger, for shaping the receptacle, devices coöperating therewith to accomplish the entire folding and forming operation by the thrust of said plunger, serving to double the sheet material upon itself to form flaps of double thickness, mechanism for applying fasteners to secure said flaps in position externally of said receptacle, a blanking press having means for making fold lines on the sheet material to facilitate said folding operations, and means for feeding the sheet material to said press, serving also to feed said blank from the press to a position between said devices and plunger, said press having means for serving the blank from the body of the sheet material while forming the next blank.

20. A machine for folding and fastening sheet material to form receptacles, comprising a reciprocating plunger for shaping the receptacle, devices coöperating therewith to accomplish the entire folding and forming operation by the thrust of said plunger, serving to double the sheet material upon itself to form flaps of double thickness, and mechanism for applying fasteners to secure said flaps in position externally of said receptacle, said flap folding devices being movable a distance with said plunger.

21. A machine for folding and fastening sheet material to form receptacles, comprising a reciprocating plunger for shaping the receptacle, devices coöperating therewith to accomplish the entire folding and forming operation by the thrust of said plunger, serving to double the sheet material upon itself to form flaps of double thickness, and mechanism for applying fasteners to secure said flaps in position externally of said receptacle, said devices including a member for engaging the bottom of the receptacle in opposition to the forward movement of the plunger, said member having means for folding the end walls of the receptacle, and said member being movable to effect the release and downward discharge of the finished receptacle.

22. A machine for folding and fastening sheet material to form receptacles, comprising a reciprocating plunger for shaping the receptacle, devices coöperating therewith to accomplish the entire folding and forming operation by the thrust of said plunger, serving to double the sheet material upon itself to form flaps of double thickness, and mechanism for applying fasteners to secure said flaps in position externally of said receptacle, said devices including a hollow and movable form which receives the bottom of the folded receptacle.

23. A machine for folding and fastening sheet material to form receptacles, comprising a reciprocating plunger for shaping the receptacle, devices coöperating therewith to accomplish the entire folding and forming operation by the thrust of said plunger, serving to double the sheet material upon itself to form flaps of double thickness, and mechanism for applying fasteners to secure said flaps in position externally of said receptacle, said devices including a hollow form having sloping sides, and folding means for engaging the material before the same reaches said form.

24. A machine for folding and fastening sheet material to form receptacles, comprising a reciprocating plunger for shaping the receptacle, devices coöperating therewith to accomplish the entire folding and forming operation by the thrust of said plunger, serving to double the sheet material upon itself to form flaps of double thickness, and mechanism for applying fasteners to secure said flaps in position externally of said receptacle, said devices including a form into which the incomplete receptacle is thrust by the plunger, some of said devices engaging the material before the same reaches said form, and means whereby said form is movable toward and away from said plunger.

25. A machine for folding and fastening sheet material to form receptacles, comprising a reciprocating plunger for shaping the receptacle, devices coöperating therewith to accomplish the entire folding and forming operation by the thrust of said plunger, serving to double the sheet material upon itself to form flaps of double thickness, and mechanism for applying fasteners to secure said flaps in position externally of said receptacle, said devices and plunger being constructed and arranged to provide the receptacle with rounded and unbroken corners, and including a movable receiving former coöperating with said plunger to form said corners.

26. In a butter dish machine, dish-forming instrumentalities for folding the sheet material including means for creasing the material along lines to form outer flaps of double thickness and inner end walls that taper toward the upper edges of the dish, and means for inserting staples to secure the folded and creased portions in position.

27. In a butter dish machine, dish-forming instrumentalities including automatic means for depressing end portions of the sheet material, means for deflecting flaps of double thickness over each depressed portion, having provision for creasing the material along lines to form end walls that taper toward the upper edges of the dish, and mechanism to fasten the flaps and tapered walls together at opposite sides of the dish.

28. In a butter dish machine, dish-forming instrumentalities including automatic means for deflecting opposite edge portions of the blank toward each other, means for doubling and folding over the material at each side of said portions, to place two integral double thicknesses upon each deflected edge portion, having provisions for creasing the material along converging lines to form inner end walls that taper toward the upper edges of the dish, and means for inserting staples through said walls at the tapered ends thereof to hold the said folded portions in place.

29. In a butter dish machine, dish-forming instrumentalities including automatic means for deflecting opposite edge portions of the blank, arranged to double certain portions of the material upon itself, and for then folding the doubled portions upon said deflected portions, having provisions for causing one doubled portion to overlap the other, said means disposed in position to crease the material along converging lines forming inner end walls that taper toward the upper edges of the dish, and means for driving staples to fasten said folded portions in place to form a dish or receptacle.

30. In a butter dish machine, a form, a concave die provided with a hollow stem, springs and bumpers for said stem, a knockout within said die, having a solid stem sliding within said hollow stem, means on said knockout coöperating with said die to fold and double the sheet material, thereby forming flaps of double thickness, means for inserting fasteners to secure said flaps in place, springs and bumpers for said solid stem, and adjusting means for the solid stem at the upper end thereof.

31. A machine for making receptacles from sheet material, comprising a reciprocating plunger for shaping the receptacle, devices coöperating therewith to accomplish the entire folding and forming operation by the thrust of said plunger against a flat unfolded section of sheet material, having means to form two-ply flaps with the folded edges thereof compressed against the outer surface of the receptacle, and mechanism for applying fasteners to secure said flaps in place, said devices including a receiving former and a plurality of rigidly connected folders disposed between said former and the plunger, and instrumentalities for providing relative movement between the receiving former and said folders to discharge the completed receptacle downward.

32. A machine for making receptacles from sheet material, comprising a reciprocating plunger for shaping the receptacle, devices coöperating therewith to accomplish the entire folding and forming operation by the thrust of said plunger against a flat unfolded section of sheet material, having means to form two-ply flaps with the folded edges thereof compressed against the outer surface of the receptacle, and mechanism for applying fasteners to secure said flaps in place, said devices including a receiving former and a plurality of rigidly connected folders disposed between said former and the plunger, and instrumentalities for providing relative movement between the receiving former and said folders to discharge the completed receptacle downward, said mechanism operating to compress said flaps, and said devices having spaces through which said mechanism has access to the folded receptacle.

33. A machine for making receptacles from sheet material, comprising a reciprocating plunger for shaping the receptacle, devices coöperating therewith to accomplish the entire folding and forming operation by the thrust of said plunger against a flat unfolded section of sheet material, having means to form two-ply flaps with the folded edges thereof compressed against the outer surface of the receptacle, and mechanism for applying fasteners to secure said flaps in place, said devices including a receiving former and a plurality of rigidly connected folders disposed between said former and the plunger, and instrumentalities for providing relative movement between the receiving former and said folders to discharge the completed receptacle downward, said machine having means for operating upon the said material in advance of said devices to insure the said folding thereof.

34. A machine for making receptacles from sheet material, comprising a reciprocating plunger for shaping the receptacle, devices coöperating therewith to accomplish the entire folding and forming operation by the thrust of said plunger against a flat unfolded section of sheet material, having means to form two-ply flaps with the folded edges thereof compressed against the outer surface of the receptacle, and mechanism for applying fasteners to secure said flaps in place, said devices including a receiving former and a plurality of rigidly connected folders disposed between said former and the plunger, and instrumentalities for providing relative movement between the receiving former and said folders to discharge the completed receptacle downward, said machine including a blanking press constructed to form a blank having unbroken edges all around and score lines for facilitating said folding operation, mechanism for feeding the sheet material to said press, and from the latter to a position between said devices and plunger, means on said blanking press to sever the blank from the main sheet while the next blank is being formed, and means for operating said feed mechanism and press and plunger.

35. A machine for making receptacles from sheet material, comprising a reciprocating plunger for shaping the receptacle, devices coöperating therewith to accomplish the entire folding and forming operation by the thrust of said plunger against a flat unfolded section of sheet material, having means to form two-ply flaps with the folded edges thereof compressed against the outer surface of the receptacle, and mechanism for applying fasteners to secure said flaps in place, said devices including a receiving former and a plurality of rigidly connected folders disposed between said former and the plunger, and instrumentalities for providing relative movement between the receiving former and said folders to discharge the completed receptacle downward, said plunger being tapered, and said former having beveled sides conforming to said taper of the plunger.

36. A machine for making receptacles from sheet material, comprising a reciprocating plunger for shaping the receptacle, devices coöperating therewith to accomplish the entire folding and forming operation by the thrust of said plunger against a flat unfolded section of sheet material, having means to form two-ply flaps with the folded edges thereof compressed against the outer surface of the receptacle, and mechanism for applying fasteners to secure said flaps in place, said devices including a receiving former and a plurality of rigidly connected folders disposed between said former and the plunger, and instrumentalities for providing relative movement between the receiving former and said folders to discharge the completed receptacle downward, said devices having a flat portion which bears against the bottom wall of the receptacle in opposition to said plunger.

37. A machine for making receptacles from sheet material, comprising a reciprocating plunger for shaping the receptacle, devices coöperating therewith to accomplish the entire folding and forming operation by the thrust of said plunger against a flat unfolded section of sheet material, having means to form two-ply flaps with the folded edges thereof compressed against the outer surface of the receptacle, and mechanism for applying fasteners to secure said flaps in place, said devices including a receiving former and a plurality of rigidly connected folders disposed between said former and the plunger, and instrumentalities for providing relative movement between the receiving former and said folders to discharge the completed receptacle downward, said mechanism having means for applying fasteners which reach from one flap to another across the outer surface of the receptacle, and for thereby compressing said flaps.

38. A machine for making receptacles from sheet material, comprising a reciprocating plunger for shaping the receptacle, devices coöperating therewith to accomplish the entire folding and forming operation by the thrust of said plunger against a flat unfolded section of sheet material, having means to form two-ply flaps with the folded edges thereof compressed against the outer surface of the receptacle, and mechanism for applying fasteners to secure said flaps in place, said devices including a receiving former and a plurality of rigidly connected folders disposed between said former and the plunger, and instrumentalities for providing relative movement between the receiving former and said folders to discharge the completed receptacle downward, said folders being removable by themselves and supported in position to bend certain portions of the blank toward each other immediately inside of said flaps.

39. A tray machine comprising a blank folding plunger, devices coöperating therewith to accomplish the entire folding operation by the thrust of said plunger against a flat blank, and to provide the tray with two-ply flaps having folded edges, mechanism for compressing said flaps by applying a plurality of separate fasteners in fixed position from one flap to another across the outside of the receptacle, and means for operating said mechanism and plunger.

40. A tray machine comprising a blank folding plunger, devices coöperating therewith to accomplish the entire folding operation by the thrust of said plunger against a flat blank, and to provide the tray with two-ply flaps having folded edges, mechanism for compressing said flaps by applying a plurality of separate fasteners in fixed position from one flap to another across the outside of the receptacle, and means for operating said mechanism and plunger, said mechanism including means for causing each fastener to straddle an edge of two flaps, and to engage a portion of the wall closing the space between flaps.

41. A tray machine comprising a blank folding plunger, devices coöperating therewith to accomplish the entire folding operation by the thrust of said plunger against a flat blank, and to provide the tray with two-ply flaps having folded edges, mechanism for compressing said flaps by applying a plurality of separate fasteners in fixed position from one flap to another across the outside of the receptacle, and means for operating said mechanism and plunger, said devices including a movable receiving former disposed in position to compress the folded blank on the plunger and having means for automatically discharging the finished receptacle downward therefrom.

42. A tray machine comprising a blank folding plunger, devices coöperating therewith to accomplish the entire folding operation by the thrust of said plunger against a flat blank, and to provide the tray with two-ply flaps having folded edges, mechanism for compressing said flaps by applying a plurality of separate fasteners in fixed position from one flap to another across the outside of the receptacle, and means for operating said mechanism and plunger, in combination with means operating upon the blank in advance of said plunger and thus coöperating therewith for causing the walls inside of said flaps to assume a pronounced upward taper at the side edges thereof during said folding operation.

43. A tray machine comprising a blank folding plunger, devices coöperating therewith to accomplish the entire folding operation by the thrust of said plunger against a flat blank, and to provide the tray with two-ply flaps having folded edges, mechanism for compressing said flaps by applying a plurality of separate fasteners in fixed position from one flap to another across the outside of the receptacle, and means for operating said mechanism and plunger, said machine having means for feeding the unfolded end portion of a strip of sheet material between said devices and the plunger, and a cutter for severing said end portion from the sheet before the completion of said folding operation.

44. A tray machine comprising a blank folding plunger, devices coöperating therewith to accomplish the entire folding operation by the thrust of said plunger against a flat blank, and to provide the tray with two-ply flaps having folded edges, mechanism for compressing said flaps by applying a plurality of separate fasteners in fixed position from one flap to another across the outside of the receptacle, and means for operating said mechanism and plunger, said machine having means for feeding the unfolded end portion of a strip of sheet material between said devices and the plunger, and a cutter for severing said end portion from the sheet before the completion of said folding operation, there being devices arranged to operate upon the sheet between said feeding means and cutter to thereby insure the desired formation of said flaps during said folding operation.

45. A butter dish machine comprising a plunger, devices coöperating therewith to entirely form the dish by the thrust of said plunger against a flat unfolded blank of sheet material, means operating upon said blank in advance of said plunger and thus coöperating therewith to produce opposite walls of less width than the dish, said means and devices coöperating to form external flaps of such shape that said walls have a pronounced upward taper at their side edges, and mechanism for inserting fasteners to secure said flaps upon said outer walls, said means including elements for making outwardly converging fold lines defining the edges of said walls.

46. A machine for folding and fastening sheet material to form receptacles, comprising a plunger for shaping the receptacle, devices coöperating therewith to accomplish the entire folding operation by the thrust of said plunger against a flat and unfolded blank of sheet material, said devices including means for doubling and thereby creasing portions of the blank along lines to form two-ply flaps having folded outer edges, and said devices having means for bending walls into position to receive said flaps, said machine having mechanism for applying fasteners to hold said flaps under compression against said walls.

47. A butter dish machine comprising a plunger, devices coöperating therewith to entirely form the dish by the thrust of said plunger against a flat unfolded blank of sheet material, means operating upon said blank in advance of said plunger and thus coöperating therewith to produce opposite walls of less width than the dish, said means and devices coöperating to form external flaps of such shape that said walls have a pronounced upward taper at their side edges, and mechanism for inserting fasteners to secure said flaps upon said outer walls, said means including elements for making outwardly converging fold lines defining the edges of said walls, and said devices having means for causing said flaps to overlap each other.

48. A machine for folding and fastening sheet material to form receptacles, comprising a plunger for shaping the receptacle, devices coöperating therewith to accomplish the entire folding operation by the thrust of said plunger against a flat and unfolded blank of sheet material, said devices including means for creasing portions of the blank to form two-ply flaps having folded edges, and said devices having means for bending walls into position to receive said flaps, said machine having mechanism for applying fasteners to hold said flaps under compression against said walls, and said machine having means operating upon the blank in advance of said devices to insure the proper formation of said flaps.

49. A machine for folding and fastening sheet material to form trays, comprising a plunger for shaping the tray, means for reciprocating said plunger, folding and forming devices coöperating with said plunger to accomplish the entire folding and shaping operation by the thrust of the plunger against a flat and unfolded blank of sheet material, and instrumentalities for applying fasteners to the tray, said devices having means to form two-ply flaps in position for receiving said fasteners, and mechanism for causing relative movement between elements of said forming devices to automatically discharge the finished tray downward therefrom.

50. A machine for folding and fastening sheet material to form trays, comprising a plunger for shaping the tray, means for reciprocating said plunger, folding and forming devices coöperating with said plunger to accomplish the entire folding and shaping operation by the thrust of the plunger against a flat and unfolded blank of sheet material, and instrumentalities for applying fasteners to the tray, said devices having means to form two-ply flaps in position for receiving said fasteners, and mechanism for causing relative movement between elements of said forming devices to automatically discharge the finished tray downward therefrom, said mechanism including springs arranged to separate said elements after said fastening operation.

51. A machine for folding and fastening sheet material to form trays, comprising a plunger for shaping the tray, means for reciprocating said plunger, folding and forming devices coöperating with said plunger to accomplish the entire folding and shaping operation by the thrust of the plunger against a flat and unfolded blank of sheet material, and instrumentalities for applying fasteners to the tray, said devices having means to form two-ply flaps in position for receiving said fasteners, and mechanism for causing relative movement between elements of said forming devices to automatically discharge the finished tray downward therefrom, said machine having means for preliminarily making fold-lines on the sheet material at angles forming triangular sections that afterward constitute the inner layers of said flaps, thereby to facilitate said folding operation.

52. A machine for folding and fastening sheet material to form trays, comprising a plunger for shaping the tray, means for reciprocating said plunger, folding and forming devices coöperating with said plunger to accomplish the entire folding and shaping operation by the thrust of the plunger against a flat and unfolded blank of sheet material, and instrumentalities for applying fasteners to the tray, said devices having means to form two-ply flaps in position for receiving said fasteners, and mechanism for causing relative movement between elements of said forming devices to automatically discharge the finished tray downward therefrom, said mechanism comprising means for positively holding two relatively movable elements of said devices in position against the final thrust of said plunger, and also while said fasteners are being applied, to flatten the outer creases of said flaps against the adjacent walls of said tray, and springs to automatically separate said elements and thereby effect the downward discharge of the finished tray.

Signed by me at St. Joseph, Berrien county, Michigan this 18th day of March 1908.

EDWARD CRAIG.

Witnesses:
CHAS. W. STRATTON,
HELEN C. CLARKE.